United States Patent Office.

THOMAS L. OLDEN, OF BROOKLYN, NEW YORK.

Letters Patent No. 100,553, dated March 8, 1870.

IMPROVEMENT IN PURIFYING ACETIC ACID.

The Schedule referred to in these Letters Patent and making part of the same

---

To all whom it may concern:

Be it known that I, THOMAS L. OLDEN, of Brooklyn, in the county of Kings, and State of New York, have invented a new and improved Process of Purifying Acetic or Pyroligneous Acid, and I do hereby declare that the following is a full and exact description thereof.

My invention consists in making and purifying acetic or pyroligneous acid by one process of distillation, which is conducted as follows:

The materials ordinarily employed for the production of acetic acid, viz: acetate of lime and muriatic acid, are introduced into the usual distillatory apparatus, the muriatic acid being employed in such proportion as to remain in slight excess.

The vapors evolved during distillation, consisting of acetic and muriatic acids, accompanied by empyreumatic impurities, are conducted into a suitable receptacle containing black or binoxide of manganese, so arranged in small fragments as to permit the vapor to pass freely, while all portions thereof shall come in contact with the binoxide.

By this means the muriatic-acid vapor is decomposed with evolution of chlorine, which, in its nascent state, at once attacks and destroys the empyreumatic matter, leaving the product, after proper condensation in the usual refrigeratory apparatus, free from empyreuma, and ready for use in its various applications in the arts, &c.

If sulphuric acid and an acetate are to be used in the production of acetic acid, I add a slight excess of muriatic acid to the mixture, and proceed as above. Or an excess of sulphuric acid and the equivalent proportion of chloride of sodium, or other chloride may be used to produce the required amount of muriatic vapor.

If I desire to purify crude pyroligneous acid, as obtained by the destructive distillation of wood, I add thereto about three per cent. of muriatic acid at 20° Baumé, and proceed in the manner already described. Or a certain proportion of crude pyroligneous acid may be added to the materials used for the production of acetic acid, and the whole distilled together in the manner described.

Having thus described my invention,

What I claim as new, and desire to secure by Letters Patent, is—

1. The process of purifying acetic or pyroligneous acid, while in the state of vapor, by the action of nascent chlorine and of binoxide of manganese, substantially as herein described.

2. The use of binoxide of manganese in purifying acetic-acid vapor, in the manner set forth.

THOMAS L. OLDEN.

Witnesses:
G. B. ROBBINS,
JOHN H. LA ROZA.